Feb. 3, 1959     L. J. AINSWORTH     2,871,965

STEERING DRIVE AXLE

Filed May 31, 1955

INVENTOR
LAINE J. AINSWORTH
BY Naylor & Neal
ATTORNEYS

United States Patent Office 2,871,965
Patented Feb. 3, 1959

2,871,965

STEERING DRIVE AXLE

Laine J. Ainsworth, Danville, Calif., assignor to Harleigh Holmes 4-Wheel Drive Company, Littleton, Colo., a corporation of Colorado Application May 31, 1955, Serial No. 512,060

1 Claim. (Cl. 180—43)

This invention relates to a driving mechanism for motor vehicles, and more particularly to improvements in steering drive axle assemblies whereby said assemblies may be made more efficient in operation and more rugged and durable in construction.

An object of the invention is to provide in such an assembly in combination, a non-rigid Carden type universal joint connection between the driver and driven axles and a full floating driven axle, thereby reducing to a minimum those stress and strain factors which tend to cause a breakdown of the steering drive axle assembly.

A further object of the invention is to provide in such an assembly an adjustingly slidable clamp type connection between the torque bar of the Carden type universal joint and the inner end of the driven axle, whereby, through preliminary turning of the driven axle and rotation of the wheel, the torque bar will be caused to seek the center of the universal joint, after which it may be fixedly clamped to the driven axle.

Still a further object of the invention is to provide, in combination, such a self adjusting clampable connection between the torque bar of the Carden type universal joint and the driven axle and a non-rigid Carden type universal joint, i. e. where radial free play is permitted between the compensating ring and the drive yoke and between the ring and the torque bar, thereby reducing to a minimum those stress and strain factors which tend to cause a breakdown of the steering drive axle assembly.

And still a further object of the invention is to provide, in combination, such a self adjusting clampable connection between the torque bar and the driven axle and a full floating driven axle, thereby reducing to a minimum those stress and strain factors which tend to cause a breakdown of the steering drive axle assembly.

These and other objects and advantages of the invention will be apparent from the following description taken in conjunction with the drawing forming part of this specification, and in which.

Figure 1:
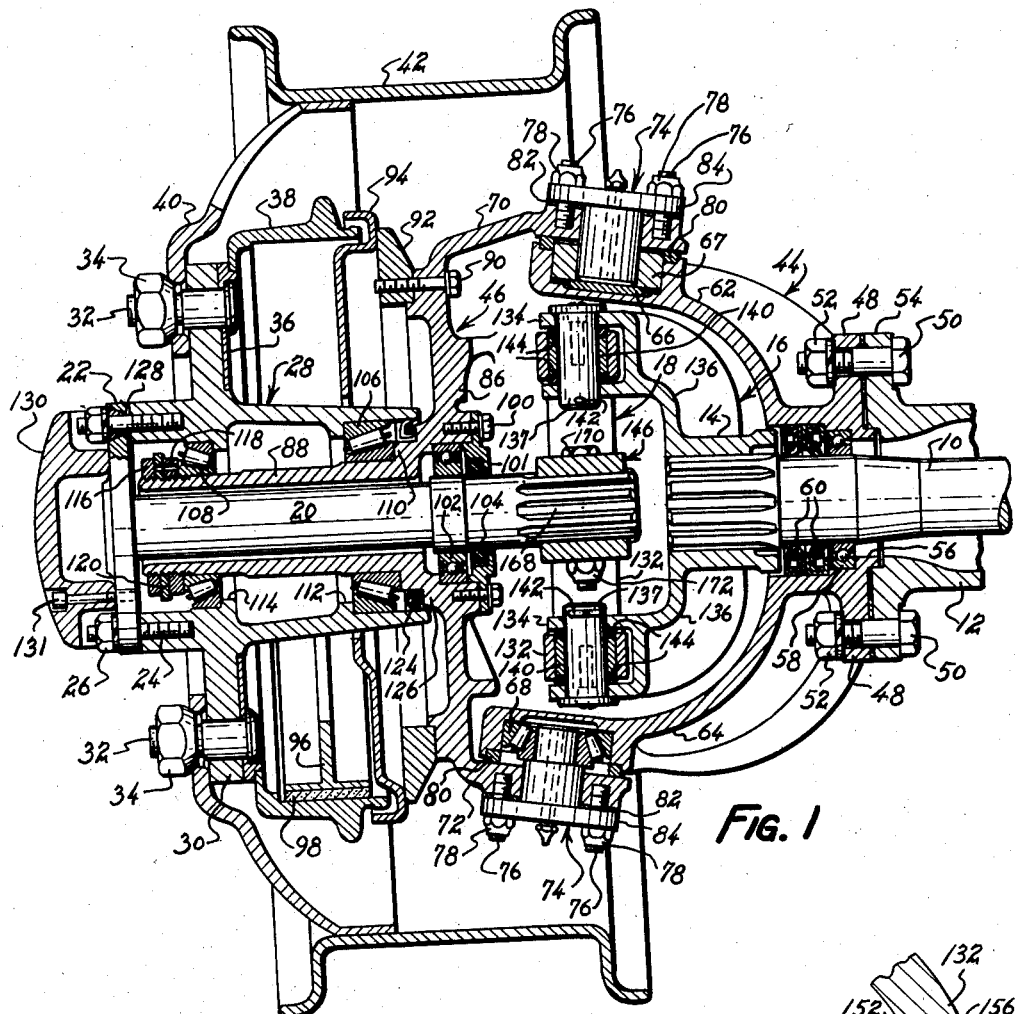
Figure 1 is a view in vertical diametral section of one end of the subject steering drive axle assembly.
Figure 2:
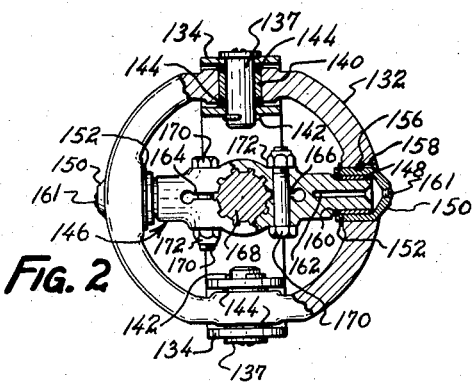
Figure 2 is a view partly in section and partly in elevation of the universal joint of the assembly.
Figure 3:
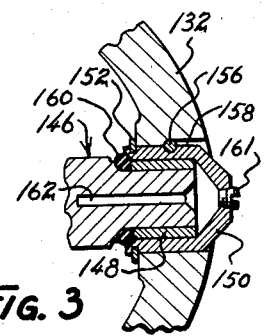
Figure 3 is an enlarged view of the right hand portion of Figure 2.

With reference to Figure 1, an inner axle shaft 10, disposed within axle housing 12 and having its inner end, not shown, connected by means of an involute spline to the side gear of the conventional differential, not shown, has its outer end spline-connected to hub portion 14 of drive yoke 16. The drive yoke 16 is connected through a Carden type universal joint indicated generally by 18 to outer axle shaft 20. Shaft 20 is provided with a driving flange 22 which is connected by studs 24 and nuts 26 to outer wheel hub 28 which has secured to radial flange 30 thereof, as by studs 32 and nuts 34, plate 36 serving as the carrier for brake drum 38 and web 40 serving as the carrier for rim 42 upon which a tire, not shown, is adapted to be mounted.

The non-rotatable structural support means for the rotatable elements above-mentioned comprise a suspension yoke 44 and an inner wheel hub 46 pivotally connected to yoke 44. Yoke 44 is provided with an end flange 48 which is secured, as by studs 50 and nuts 52, to a flange 54 carried at the outer end of the axle housing 12. The yoke 44 is provided with an annular pilot extension 56 which fits within the counterbored end of housing 12 and is provided with two internal counterbores, within one of which roller bearing 58 for shaft 10 is fitted and within the other of which is disposed a pair of seals 60 having a wiping engagement with shaft 10.

The two arms 62 and 64 of suspension yoke 44 are provided with outwardly directed recesses within which there are disposed thrust plate 66, bushing 67 and tapered roller bearing 68. The inner wheel hub 46 is provided with suspension arms 70 and 72 which extend over the arms 62 and 64 and are pivotally secured thereto by king pin stubs 74 which extend through the arms 70 and 72 and into the bushing 67 and bearing 68 and which are secured to the arms 70 and 72, as by studs 76 and nuts 78. Seals 80 are disposed between arms 62, 70 and 64, 72, and shim packs 82 are disposed between arms 70 and 72 and the flange portions 84 of the king pin stubs 74 so that shafts 10 and 20 may be axially aligned.

The inner wheel hub 46 is provided with a radially extending portion 86 and a spindle portion 88. Hub portion 86 has secured thereto, as by cap screws 90, a ring member 92 to which there is secured, as by welding, a brake back up plate 94 carrying brake shoes 96 cooperatively related to brake band 98 carried by drum 38. Also secured to hub portion 86, as by cap screws 100, is a retainer ring 101 for a roller bearing 102 for shaft 20 and for an oil seal 104. Spindle portion 88 carries tapered roller bearings 106 and 108 which in turn support the outer wheel hub 28. Bearing 106 is positioned between shoulder 110 formed on the inner hub 46 and an inwardly directed flange 112 formed on hub 28, while bearing 108 is positioned against inwardly directed flange 114 formed on hub 28 and maintained in this position by nuts 116 and 118 and lockwasher 120 disposed on the threaded end of spindle portion 88.

An oil seal 124 seated against shoulder 126 of the inner hub 46 serves to seal the rearward side of the space between the hubs 28 and 46, while a gasket 128, hub cap 130, and hub cap attaching capscrews 131 extending through the driving flange 22 of shaft 20 serve to seal the outer side of the space between hubs 28 and 46.

The universal joint 18 comprises a compensating ring 132 extending through the bifurcated ends 134 of arms 136 of drive yoke 16 and pivotally connected to said arms by diametrically opposed drive pins 137 which extend through arms 136 and bearing metal bushings 140 and which are secured in place by cotter pins 142. O rings 144 are disposed about the pins 137 both above and beneath the bushings 140. A torque bar 146 is secured to the ring 132 at diametrically opposed points which are offset 90° from the drive pin connections between yoke 16 and the ring 132. The bar 146 is provided with reduced diameter ends which extend into bushings 148 which in turn are disposed within bearing caps 150 secured to ring 132. The caps 150 are secured against endwise movement with respect to the ring by retainer rings 152 fitted within grooves formed in the bearing caps and by steel balls 156 which are seated within dimples formed on the caps 150 and extend into grooves 158 formed in ring 132. O rings 160 are disposed within the ends of caps 150. The caps 150 are provided with removable plugs 161, and the bar 146 is provided with grease bores 162.

The middle part of the torque bar 146 is divided by oppositely directed slots 164 and 166 which communicate with the internally splined opening through which the splined end 168 of shaft 20 extends. Capscrews 170 and nuts 172 serve as the means for adjustably clamping the bar 146 to shaft 20 against end-wise movement with respect thereto.

When the steering drive axle is properly assembled for operation, the king pin axis, which is inclined at an angle of 8° with respect to the vertical, intersects the axis of rotation of shafts 10 and 20 at the point where the axis of the drive pins 137 intersects the axis of rotation of said shafts.

The important features of the subject drive axle, which, taken together, constitute a material step forward in the art are: the adjustable clamping connection between the torque bar 146 and the outer axle shaft 20; the full floating characteristics of axle shaft 20 which free shaft 20 from serving as a load bearing member; and the free play connections between the compensating ring and drive yoke and between the compensating ring and torque bar. Also important is the separable connection between the suspension yoke 44 and axle housing 12 which enables removal of the entire wheel and axle assembly, including inner axle shaft 10, as a unit from the truck.

The full floating axle 20 does not carry any load from the wheel, being limited to the function of rotating the outer wheel hub. Thus, shaft 20 is submitted to torsional forces only, caused by driving and braking strains. If shaft 20 should happen to be broken during operation of the vehicle, the wheel will still carry the load and will be rotatable, thus enabling the vehicle to be rolled from the point of breakdown to the point of axle repair. In the event that shaft 20 should be broken in operation, the load would be carried through outer hub 28, bearings 106 and 108, spindle 88, inner hub 46 and yoke 44.

The non-rigid nature of the universal joint 18, provided by the free play connections between the compensating ring 132 and drive yoke 16 and between said ring and torque bar 146, enables the drive yoke and torque bar to, in effect, move radially relative to each other. The purpose for this is to allow for a slight non-coincidence between the center point of the universal joint, the axis of rotation of outer wheel hub 28, and the axis of rotation of driving axle 10 and to thus enable a non-destructive oscillation of the driving and driven members of the universal joint. Also, even when there is coincidence between the center point of the joint and the axes of hub 28 and axle 10, this arrangement effectively cushions the universal joint against undue stress and strain due to road bumps, turning forces, and the like. Such free play is, of course, provided by the fact that the ring 132 has a thickness less than the width of the bifurcation spaces of the drive yoke within which the ring is disposed and by the fact that the torque bar O rings 160 enable radial movement between the ring 132 and the torque bar. The end result is that there is provided between the shafts 10 and 20, which are relatively rigidly supported by bearings 58 and 102, a resiliently loose and virtually indestructible universal joint connection.

The adjustable clamping connection between the torque bar 146 and driven axle 20 enables the torque bar to be centered in the center of the universal joint by the following simple procedure: the torque bar clamping means 170 and 172 are left loose; the outer wheel hub assembly is pivoted about the king pin axis to an angle of approximately 30° with the axle housing assembly; the wheel is then rotated to cause the torque bar to seek the center of the universal joint by sliding along the splines of axle 20; and when the universal joint turns freely and the torque bar has come to rest the clamping means 170 and 172 are tightened to fixedly position the torque bar on axle 20.

From the foregoing it will be readily seen that this steering drive axle assembly enables the attainment of the objects herein set forth, and while a specific and preferred form of the invention has been shown and described it is to be understood that all substantial equivalents thereof are considered to be within the spirit and scope of the invention.

What is claimed is:

In the environment of a steering drive axle assembly having a driver axle, a driven axle in outboard and spaced relation to said driver axle and in axial alignment therewith, means supporting said axles for rotation, means mounting said driven axle for horizontal turning movement with respect to said driver axle, and a Carden type universal joint connecting said axles together including a drive yoke, a compensating ring, and a torque bar adapted to be fixedly secured to the inner end of said driven axle: the improvement comprising a sliding spline connection between said torque bar and said driven axle enabling said bar to be self adjusting on said axle to seek the center of said universal joint when said driven axle is turned and rotated, clamping means embodied in said torque bar enabling said bar to be fixedly secured to said driven axle against relative movement with respect thereto when said torque bar has become self adjusted to the center of said joint, and means embodied in said joint enabling yielding relative radial movement between said drive yoke and said compensating ring and between said compensating ring and said torque bar.

References Cited in the file of this patent

UNITED STATES PATENTS

| | | |
|---|---|---|
| 963,609 | Mascord | July 5, 1910 |
| 1,307,961 | Dahlmon | June 24, 1919 |
| 1,861,753 | Peters | June 7, 1932 |
| 1,894,986 | Frins | Jan. 24, 1933 |
| 1,899,240 | Marcum | Feb. 28, 1933 |
| 1,923,649 | Warner | Aug. 22, 1933 |
| 2,042,404 | Keese | May 26, 1936 |

FOREIGN PATENTS

| | | |
|---|---|---|
| 6,343 of 1914 | Great Britain | Mar. 12, 1914 |
| 324,741 | Great Britain | Feb. 6, 1930 |
| 616,486 | Great Britain | Jan. 21, 1949 |